United States Patent [19]

Lin

[11] Patent Number: 5,422,198
[45] Date of Patent: Jun. 6, 1995

[54] STORAGE BATTERY

[75] Inventor: Hsien-Chih Lin, Tainan, Taiwan, Prov. of China

[73] Assignee: Ztong Yee Industrial Co., Ltd., Yung-Kang, Taiwan, Prov. of China

[21] Appl. No.: 154,917

[22] Filed: Nov. 17, 1993

[51] Int. Cl.6 .......................................... H01M 2/02
[52] U.S. Cl. .................................. 429/65; 429/121; 429/163; 439/449; 439/460; 439/505; 439/544
[58] Field of Search .................... 429/65, 121, 163; 439/441, 460, 501, 504, 505, 544, 755

[56] References Cited

U.S. PATENT DOCUMENTS 4,983,473  1/1991  Smith .................................... 429/48

Primary Examiner—Prince Willis, Jr.
Assistant Examiner—M. Nuzzolillo
Attorney, Agent, or Firm—Christie, Parker & Hale

[57] ABSTRACT

A storage battery has a top end which is provided with a depression to receive a pair of sockets that are connected electrically to positive and negative cables of the storage battery, and a surrounding wall which confines the top end. The surrounding wall has a pair of through-holes to permit extension of the cables therethrough so as to connect with a connector.

1 Claim, 2 Drawing Sheets

STORAGE BATTERY

BACKGROUND OF THE INVENTION

1. Field of the Invention

The invention relates to a storage battery, more particularly to the structure of a top end of the storage battery.

2. Description of the Related Art

FIG. 1 shows an exploded view of a conventional storage battery that includes a container 11 which has a top end 12 and a protective cover lid 13 which is provided on the top end 12 by means conventional of ultrasonic techniques so as to cover the same. As best illustrated, the top end 12 has two recesses 14 formed therein and two peripheral notches 122 formed through a surrounding wall 121 which defines the top end 12. Positive and negative terminal cables 16 of the conventional storage battery extend from the recesses 14 and pass through the peripheral notches 122 so as to connect with a connector 18. The top end 12 is further provided with a depression 151 that has a bottom on which two sockets 15 are mounted by means of welding. The sockets 15 are connected respectively and electrically to the positive and negative terminal cables 16 of the storage battery. The protective cover lid 13 has a through-hole 133 and a pair of covering tabs 132 which cover the peripheral notches 122 after the cover lid 13 is provided on the top end 12 of the conventional storage battery. A plug seat 131 extends from the periphery of the through-hole 133 and is received in the depression 151. The plug seat 131 confines two passages therethrough which permit extension of two legs 171 of a fuse plug 17 so as to enable the latter to engage slidingly the sockets 15 when the fuse plug 17 is plugged into the plug seat 131 of the protective cover lid 13. When the conventional storage battery is handled at the cables 16, the tension of the cables 16 and the load of the conventional storage battery combine to separate the protective cover lid 13 from the container 11. The separation correspondingly causes the fuse plug 17 to disengage from the sockets 15, thereby disconnecting an electrical connection between two cables 16 of the conventional storage battery. This can cause some inconvenience to the user.

SUMMARY OF THE INVENTION

The main objective of the present invention is to provide a storage battery which has a top end with a particular structure so that a cover lid thereof cannot disengage from a main container of the storage battery regardless of how the storage battery is carried.

Accordingly, the construction of a storage battery of the present invention is similar to that of the conventional storage battery except that the surrounding wall which defines the top end of the storage battery has two through-holes formed therethrough to permit extension of a pair of terminal cables to be connected with a connector. The protective cover lid is mounted to the top end of the storage battery by means of an ultrasonic technique. Since the surrounding wall is formed integrally with the container of the storage battery, the force applied originally at the cables cannot be transferred to the cover lid to prevent pulling of the latter away from the top end. A proper electrical connection is thus maintained regardless of how the storage battery is carried.

BRIEF DESCRIPTION OF THE DRAWINGS

Other features and advantages of the present invention will become more apparent in the following detailed description of the preferred embodiment with reference to the accompanying drawings, in which.

DETAILED DESCRIPTION OF THE PREFERRED EMBODIMENT

Figure 1:
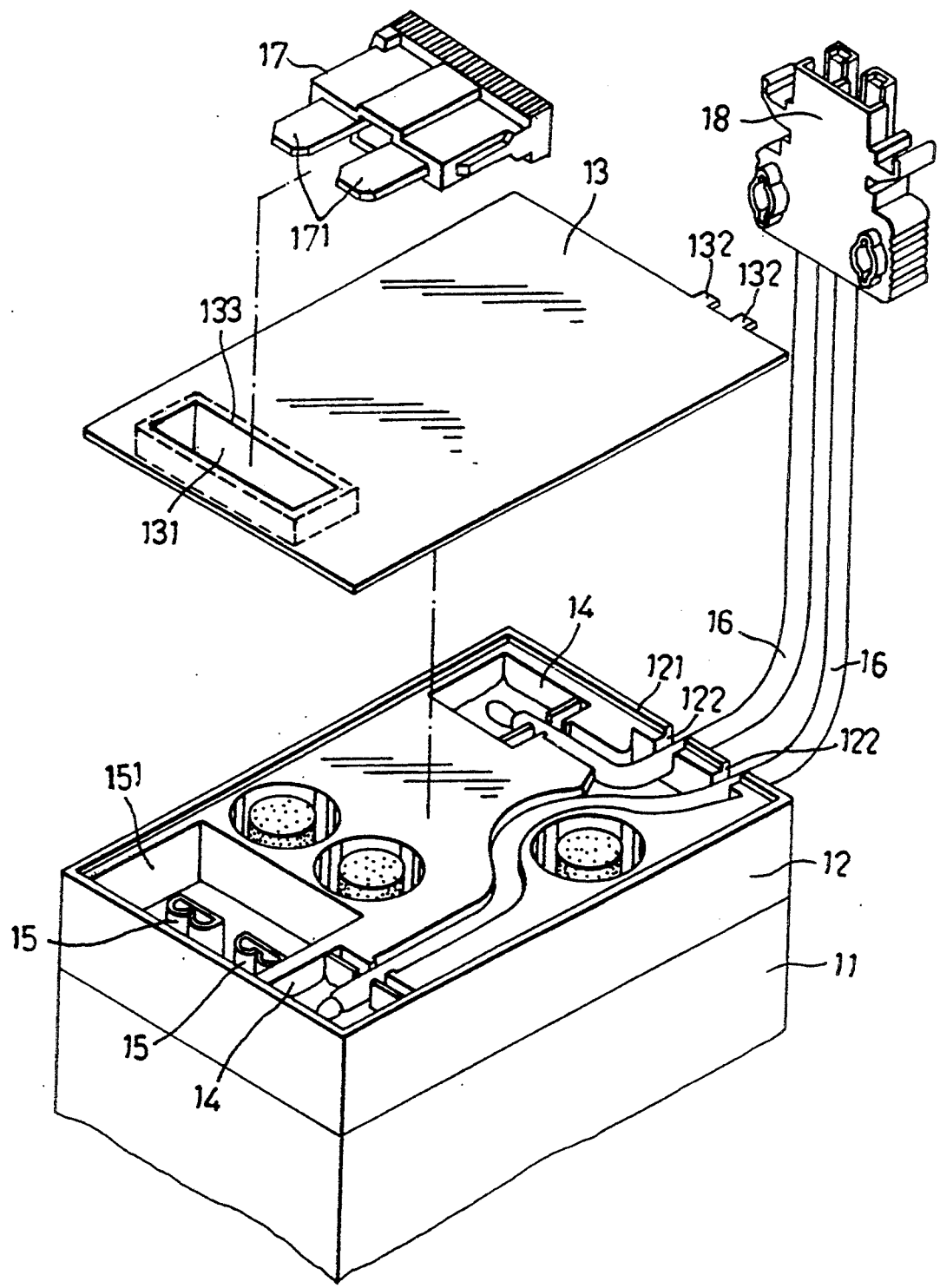
FIG. 1 shows an exploded view of a conventional storage battery.

Since the construction of the storage battery according to the present invention is generally similar to that of the conventional storage battery shown in FIG. 1, only the characterizing parts of the present invention will be described herein.

Figure 2:
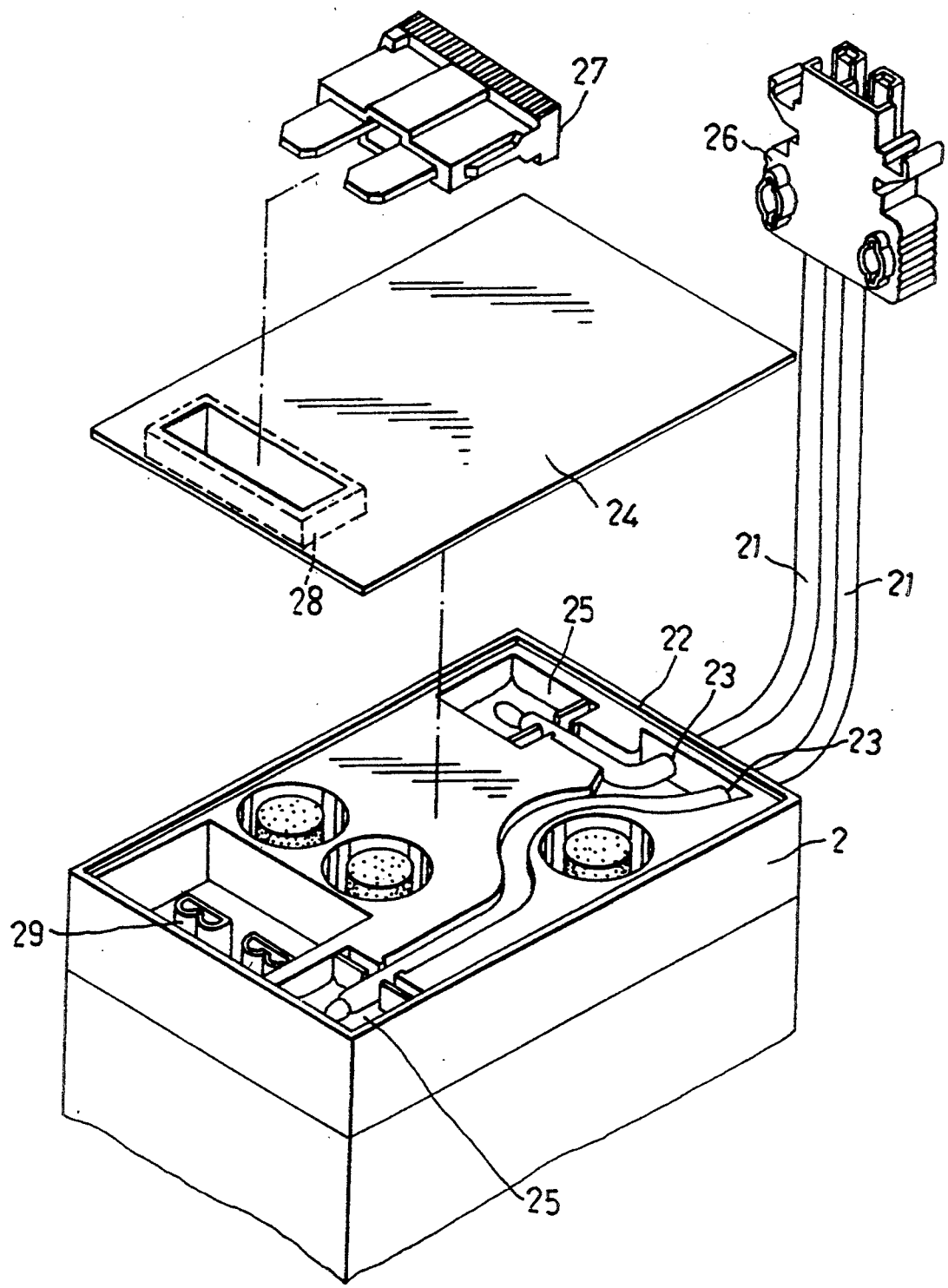
FIG. 2 shows an exploded view of a storage battery of the present invention.

Referring to FIG. 2, the storage battery of the present invention has a top end 2 and a surrounding wall 22 which confines the top end 2. The surrounding wall 22 has two through-holes 23 formed through the same. The top end 2 is formed with two depression 25 from which positive and negative terminal cables 21 extend and pass through the through-holes 23 to connect with a connector 26.

A protective cover lid 24 is sealed to the top end 2 by means of a conventional ultrasonic technique, while a fuse plug 27 is inserted into a plug seat 28 which is formed through the protective cover lid 24. Two legs of the fuse plug 27 pass through the plug seat 28 and extend slidingly into a pair of sockets 29. Since the sockets 29 are connected respectively to the positive and negative terminal cables 21 of the storage battery, the fuse (not shown) on the fuse plug 27 will open when an electric current that exceeds a bearable range passes through the fuse plug 27, thereby preventing damage to the storage battery of the present invention.

If the storage battery of the present invention was handled at the cables 21, the protective cover lid 24 will not disengage from the top end of the storage battery. The reason resides in that the terminal cables 21 are prevented by the surrounding wall 22 so that it cannot pull the cover lid 24 away relative to the top end 2. In other words, the surrounding wall 22 isolates the cover lid 24 from a pulling force from the cables 21. The fuse plug 27 is therefore retained in the inserted position and the electric connection is maintained in the storage battery. The objective of the present invention is therefore achieved.

While a preferred embodiment has been explained and described, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. In a storage battery having a top end portion with a pair of recesses formed therein, a surrounding wall confining said top end portion, a protective cover lid provided so as to cover said top end portion, and positive and negative terminal cables extending from said pair of recesses to connect with a connector; and the improvement comprising: said surrounding wall having a pair of through-holes formed therethrough to permit extension of said positive and negative cables to connect with said connector, each of said through-holes being spaced a distance from a periphery of said top end portion, whereby said surrounding wall isolates said cover lid from a pulling force from said cables.

* * * * *